United States Patent [19]
Burtis

[11] Patent Number: 5,161,953
[45] Date of Patent: Nov. 10, 1992

[54] AIRCRAFT PROPELLER AND BLADE ELEMENT

[76] Inventor: Wilson A. Burtis, 5011 Harvard Ave., Westminster, Calif. 92683

[21] Appl. No.: 793,200

[22] Filed: Nov. 18, 1991

Related U.S. Application Data

[63] Continuation-in-part of Ser. No. 647,473, Jan. 28, 1991, abandoned.

[51] Int. Cl.$^5$ .................. B64C 11/16; B64C 27/46
[52] U.S. Cl. ........................ 416/242; 416/223 R; 416/243; 416/Dig. 2
[58] Field of Search ........... 416/238, 242, 243, Dig. 2, 416/Dig. 5, 223 R

[56] References Cited

U.S. PATENT DOCUMENTS

| | | | |
|---|---|---|---|
| 1,119,826 | 12/1914 | Howell | 416/233 |
| 1,853,607 | 4/1932 | Ferreby | 416/243 |
| 2,157,999 | 5/1939 | Charavay | 416/242 |
| 4,123,198 | 10/1978 | Harbord | 416/243 |
| 4,451,206 | 5/1984 | Phileppe et al. | 416/237 |
| 4,451,207 | 5/1984 | Hoffmann | 416/237 |

FOREIGN PATENT DOCUMENTS

| | | | |
|---|---|---|---|
| 449176 | 12/1974 | U.S.S.R. | 416/242 |
| 2106192 | 4/1983 | United Kingdom | 416/242 |

Primary Examiner—Edward K. Look
Assistant Examiner—Hoang Nguyen

[57] ABSTRACT

A propeller blade element which virtually eliminates stall conditions. The rotatably driven blade element employs a long straight extended sharp leading edge from hub to tip, without helix, to insure blade laminar fluid flow without vortice formation or leading edge stagnation. The extending leading edge provides separated upper and lower laminar air flow to a "C" shaped blade configuration. The blade element in one form employs a proportionally upwardly curved trailing edge which provides accelerated flow of the high pressure air on the face of the blade, thus increasing the thrust over conventional blade elements.

9 Claims, 4 Drawing Sheets

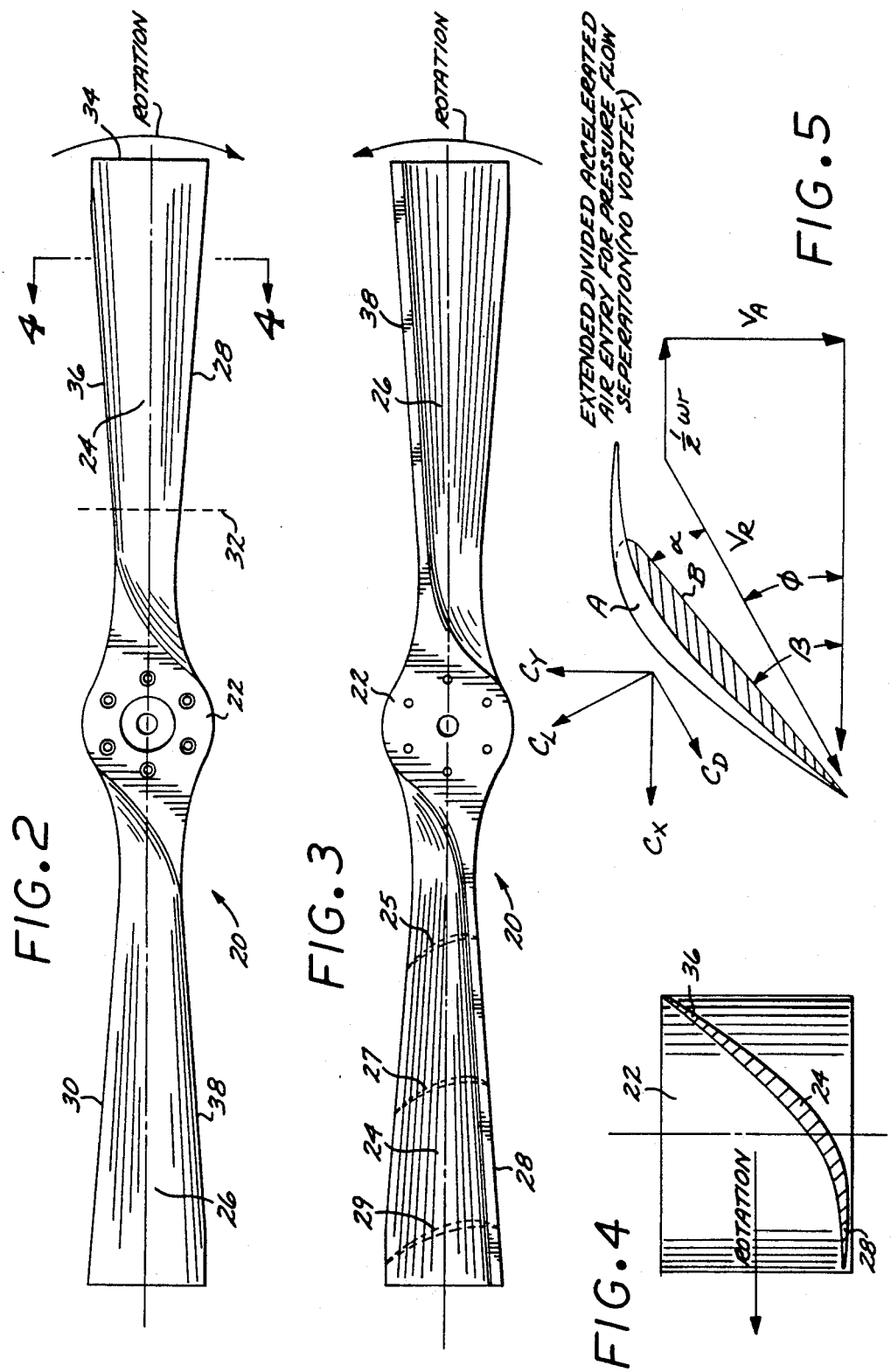

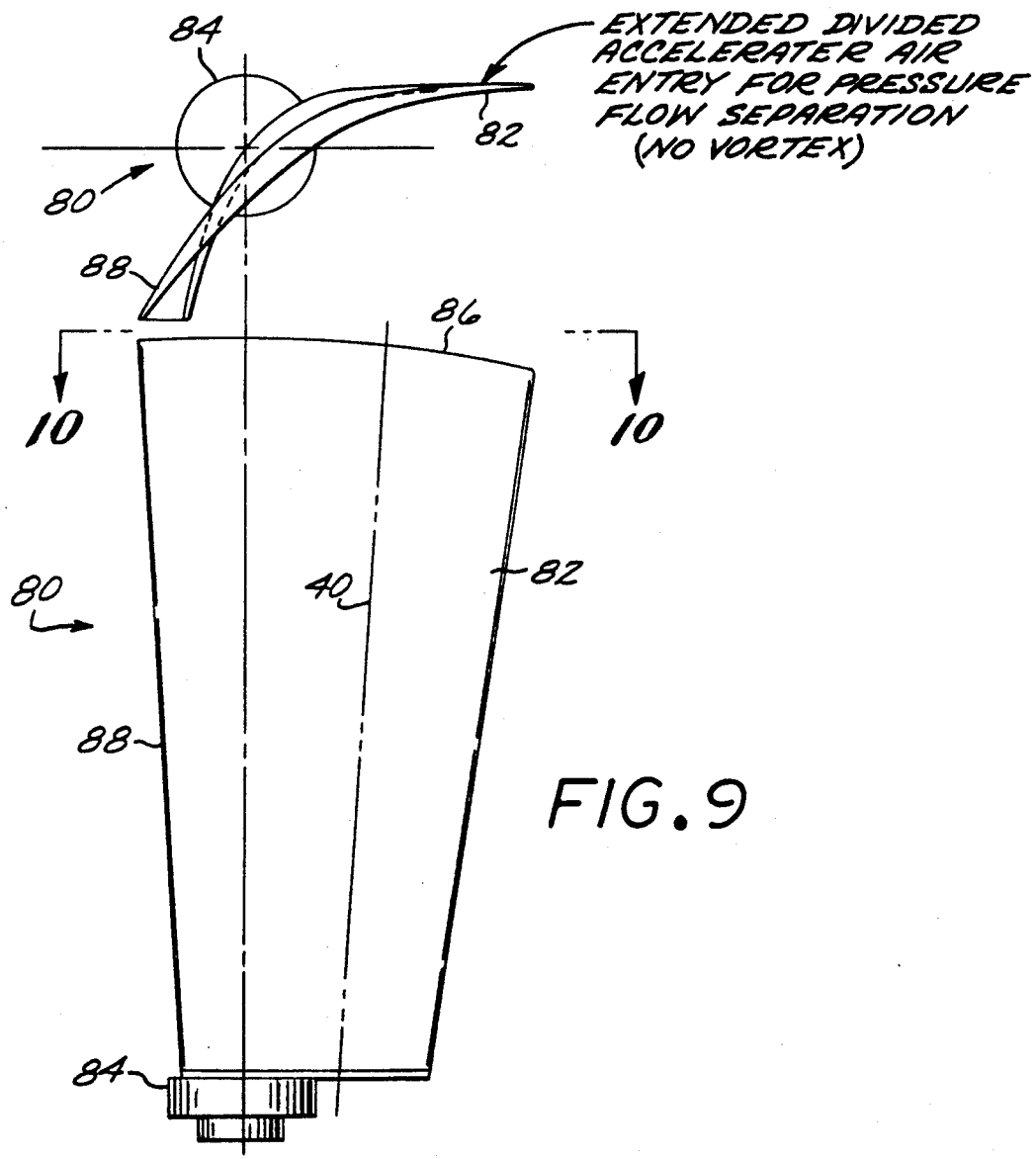

AIRCRAFT PROPELLER AND BLADE ELEMENT

Applicant claims the benefit under Title 35, United States Code, §120 of application Ser. No. 07/647,473, filed Jan. 28, 1991, entitled "Aircraft Propeller and Blade Element," by the same applicant herein. This application is a continuation in part of application Ser. No. 07/647,473 filed Jan. 28, 1991, now abandoned, and is related to application Ser. No. 07/348,771 filed May 8, 1989, entitled "Aircraft Propeller and Blade Element," by the same applicant herein.

BACKGROUND OF THE INVENTION

The present invention relates to aircraft propulsion systems, and more particularly to a propeller and blade element for such a system.

Conventional propeller blade elements have the blunt leading edge configuration illustrated in cross-section as element 10 in FIG. 1. Under certain conditions, leading edge stagnated air develops at the blunt leading edge of the conventional blade and the blade can undergo a stall condition. FIG. 1 shows the air flow around a conventional airfoil in stall condition, illustrating the vortex formation at the leading edge, and the lack of laminar air flow.

Mark's Engineering Handbook, Section 11.4 ("Aeronautics" by J. J. Cornish, III) at page 11-69, shows the stagnation point, in FIG. 11.4.4, in respect to the leading edge of an airfoil.

Laminar air flow and vortex formation conditions have a bearing on the stall characteristics of airfoils such as propellers. Such characteristics have been the subject of considerable study and analysis. See, for example, "A Comparative Study of Some Dynamic Stall Models," T. S. R. Reddy, NASA Technical Memorandum 88917, March 1987, at pages 6-7.

It is therefore an object of the invention to provide a propeller blade element which substantially eliminates the formation of leading edge stagnated air.

A further object is to provide a propeller blade element which provides a laminar fluid flow.

Another object is to provide an anti-stalling and anti-noise propeller blade element having increased efficiency over conventional blade elements, and which is capable of operation under high aerodynamic loads and over a greater speed range without a variable pitch control than conventional propeller blade elements.

SUMMARY OF THE INVENTION

A rotatably driven propeller blade element is disclosed, including a sharp leading edge element and a trailing edge element, the blade element being secured to a hub and rotatably driven in a plane of rotation. The blade element is characterized in that the leading edge defines a substantially straight line in a first region between the hub and tip, and the leading edge is sharp and defined by an extended structure. Thus, the leading edge does not follow a helix, as in conventional blade elements. The leading edge transitions to a blade element structure, defining a "C-shaped" structure. The extended straight leading edge prevents fluid pressure on one side of the blade element from interfering with the fluid pressure on the opposite side of the blade at high aerodynamic air loads, thereby eliminating a stall condition by a continuation of laminar air flow.

In another embodiment, the blade element trailing edge is upwardly curved away from the aerodynamically loaded face of the blade, and serves to accelerate the flow of the high pressure air on the face of the blade, thereby providing a higher thrust than a conventional blade element.

A propeller blade element in accordance with the invention is capable of increased blade efficiency, and operates over a greater speed range without a variable pitch control because of higher aerodynamic air loading obtained without stalling.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2 is a longitudinal rear view of a propeller embodying the invention.

FIG. 3 is a longitudinal front view of the propeller of FIG. 2, showing the sharp leading edge extension with blade cross sections shown in phantom.

FIG. 4 is a typical cross section end view of the propeller blade element of FIG. 3 and its extended sharp leading edge relationship to the propeller hub and the 'C' shape that will hold against torsional flutter loads.

FIG. 5 is a flow diagram for a conventional propeller blade element showing an overlay of the extended leading edge blade element in accordance with the invention.

FIGS. 9 and 10 are top and end views of a third embodiment of an airfoil in accordance with the invention.

DETAILED DESCRIPTION OF THE PREFERRED EMBODIMENT

Figure 1:
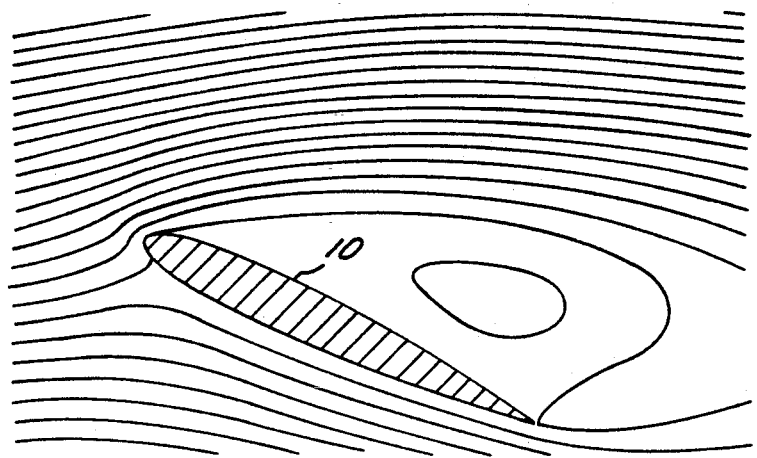
FIG. 1 is a cross-sectional view of a conventional airfoil in stall condition, illustrating the vortex formation at the leading edge and the lack of laminar air flow.

A first embodiment of an airfoil in accordance with the invention is illustrated in FIGS. 2-5. Here, a propeller 20 is shown, having a hub 22 and radially extending blade elements 24 and 26. While the propeller 20 is shown with two blade elements, it will be understood that the invention may be employed in propellers having more than two blade elements.

A preferred application of the airfoil in accordance with the invention is for use in an aircraft propulsion system as described in U.S. Pat. No. 4,446,695, the entire contents of which are incorporated herein by this reference. Thus, for such an application, the propeller will be rotatably driven to achieve thrust to propel the aircraft. In the system of U.S. Pat. No. 4,446,695, the propeller is power driven and situated within a frame to generate a rearwardly moving air stream. The blade elements are secured to a hub and rotationally driven in a plane of rotation.

The blade elements 24 and 26 of propeller 20 have several distinguishing characteristics. Each blade element 24 and 26 has a respective extended straight sharp leading edge 28 and 30 which rotates directly into the line of rotation of the propeller. The extended straight sharp leading edge of the blade element does not define a helix, as is the case with the leading edges of conventional propeller blades, but instead defines a substantially straight line from just outward of the hub to the blade tip. Thus, for example, the leading edge 28 of blade element 24 defines a substantially straight line between the point 32 and the blade tip 34. In other words, the leading edge rotates directly into the line of rotation without pitch.

FIG. 2 is a rear view of the propeller blade 20, and FIG. 3 is a frontal view. Exemplary cross-sections 25, 27, 29 are shown in phantom in FIG. 3. FIG. 4 is a cross-sectional view taken along line 4—4 of FIG. 1, and further illustrates the sharp leading edge 28 of the blade 24, and its orientation in respect to the direction of rotation of the blade element. In particular, the extended nature of the leading edge 28 is shown in FIG. 4, and its orientation, i.e., aligned with the direction of rotation of the blade element 24.

FIG. 5 is a flow diagram of a conventional propeller blade "B" in cross-section, showing an overlay of an extended leading edge blade element "A" in accordance with the invention. Thus, FIG. 5 clearly illustrates differences between the blunt leading edge of the conventional blade element B and the sharp extended leading edge of the new blade element A. In the figures the following notation is conventional in the propeller blade art:

$V_a$ = velocity annulus
$\beta$ = blade pitch (degrees)
$\alpha$ = angle of attack
$C_Y$ = thrust coefficient
$C_L$ = lift coefficient
$C_X$ = torque coefficient
$C_D$ = drag coefficient
$V_R$ = velocity of the blade (prop radius)
$\phi$ = advance angle (pitch)
$\frac{1}{2}\omega r$ = air stream rotation velocity The portion of the blade elements extending forward from the trailing edge to the base portion of the extended leading edge does define a helix in the manner of conventional propeller blades. Thus, for example, in FIG. 5, the region 40 of the blade A located behind the extended leading edge defines a helical shape from the hub region to the blade tip region. The extended leading edge is straight, however, and defines a straight line, and not a helical shape.

FIG. 5 also illustrates the general "C-shaped" configuration defined by the new blade cross-section which will hold against torsional flutter loads.

The angle of attack, blade pitch, blade thickness, and blade area (i.e., the activity factor for a blade element embodying the invention) for a particular application can be determined in accordance with the foregoing discussion of the invention and the use of well-known propeller design principles. One exemplary reference is R. W. Honey, "Simplified Propeller for Low Speed Home Built Aircraft," Fourth Ed., January 1981.

Figure 6:
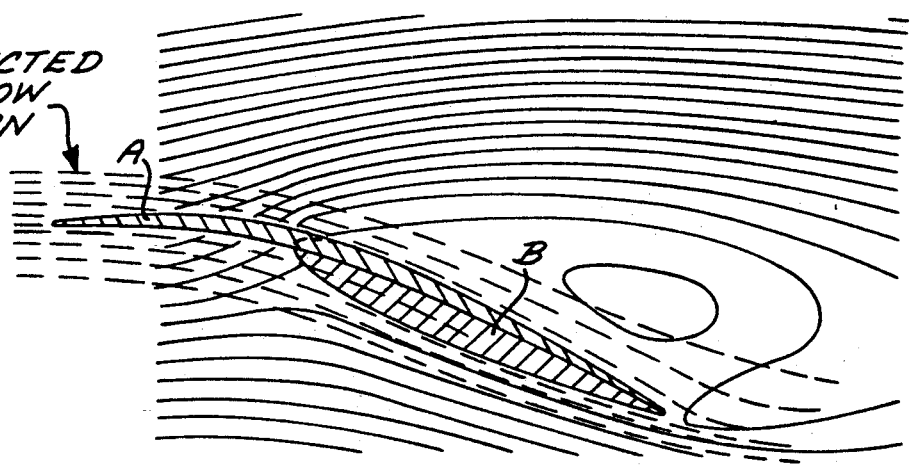
FIG. 6 is a flow diagram of a conventional airfoil in stall condition, with an overlay of an airfoil embodying the invention and the laminar air flow about the new airfoil.

A blade element in accordance with the invention and as shown in FIGS. 2-5 provides several important advantages. The straight sharp extended sharp leading edge ensures a laminar air flow about the blade, as shown in FIG. 6. FIG. 6 shows the redirected air flow pattern for the new propeller blade element as superimposed on the conventional blade, illustrating the laminar flow pattern resulting from the invention. The extended sharp leading edge separates the air flow from each side of the blade element and prevents the air flow on one side from interfering with the air flow from the other side. Because the extended sharp leading edge of applicant's invention presents a far smaller cross-sectional area in the direction of air flow, the formation of stagnated air at the leading edge is virtually eliminated. This leading edge configuration also prevents leading edge stagnated air from forming, as well as vortex formation. The straight extended sharp leading edge prevents the fluid pressure and fluid flow activity of each side of the blade element from interfering with the fluid pressure and flow activity of the other side. As a result, the propeller provides a significant thrust increase and noise reduction over conventional propellers. Moreover, airfoil stalling is virtually eliminated by the blade element in accordance with the invention.

A propeller in accordance with the invention provides increased propulsion and blade efficiency over conventional propellers, and operates over a greater speed range without a variable pitch control.

Figure 7:
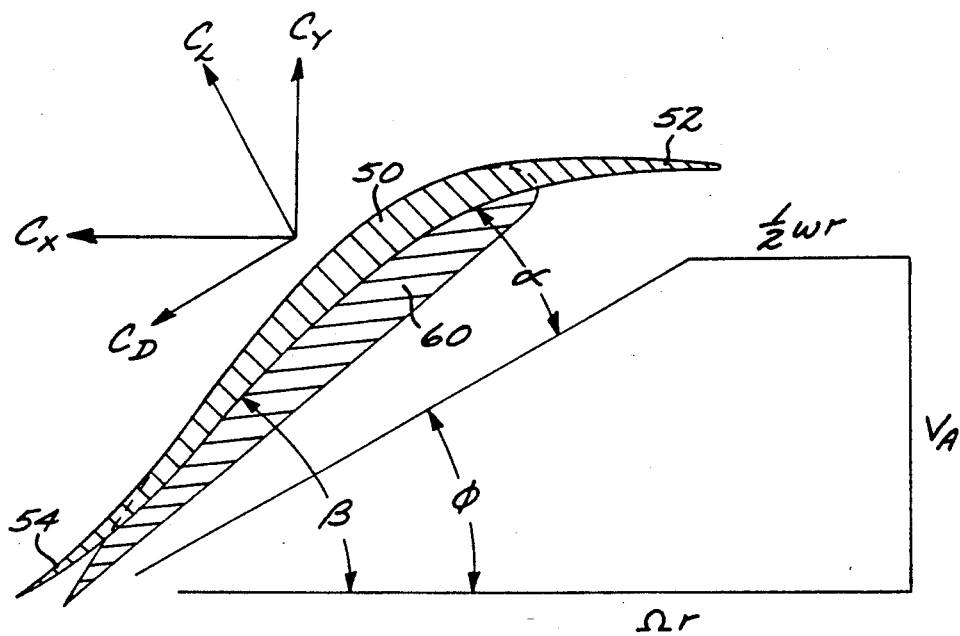
FIGS. 7 and 8 are cross-sectional diagrams illustrative of a second embodiment of an airfoil in accordance with the invention.
Figure 8:
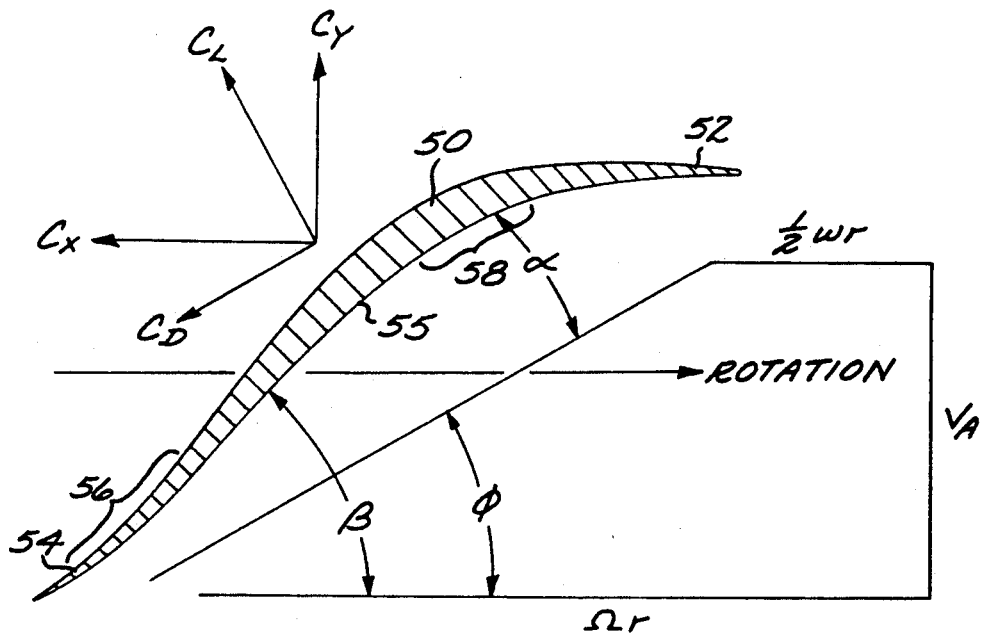

A second embodiment of a propeller blade 50 in accordance with the invention is illustrated in cross-section in FIGS. 7 and 8. The propeller 50 is similar to the embodiment of FIGS. 2-5, in that it includes the extended straight sharp leading edge 52; however, the trailing edge 50 of the propeller blade 54 is curved away from the aerodynamically loaded face 55 of the blade 50. This configuration of the blade trailing edge serves to accelerate the flow of the high pressure air on the high air load face 55 of the blade, thereby increasing the thrust over that of conventional rounded leading edge blades. The curving of the trailing edge 54 away from the loaded face 55 presents a negative angle to the air flow over the face 55, thereby serving to reduce the air pressure on the face 55 at the trailing edge 54 and accelerating the flow of air over the loaded face 55 in accordance with the Bernoulli effect. To illustrate differences between the new blade element and conventional rounded edge propeller blades, the new blade 50 is shown superimposed on such a conventional blade element 60 in FIG. 7.

The blade 50 is also shown above in cross-section in FIG. 8. The curvature of the trailing edge 54 is essentially the mirror image of the blade curvature in the region 58, transitioning from the middle region of the blade surface to the leading edge.

FIGS. 9 and 10 illustrate a third embodiment of a propeller blade element embodying the invention. Here, the blade element 80 is for use in an aircraft propulsion system as described in U.S. Pat. No. 4,446,695. FIG. 9 is a top view of the blade element 80 characterized by an extended straight leading edge 82 and blade tip 86, and secured to a hub member 84. FIG. 10 is an end view taken at line 10-10 looking toward the hub 84. The straightness of the leading edge 82 and the helical curvature of the region of the blade element between line 90 and the trailing edge 88 in the conventional manner are clearly shown in FIG. 10. The region of the blade element between the leading edge 82 and line 90 is straight.

As shown in FIG. 10, the extended leading edge 82 has a dimension in the rotational direction which increases from the blade root or hub to the outer tip of the blade, i.e., the distance between the blade edge in the rotational direction and line 90 increases from the blade hub to tip. The reason for this increase in dimension is to contain the increased air pressure which is experienced toward the blade tip in comparison to the pressure near the hub. The pressure increases toward the tip due to the increasing velocity of the blade from near the hub to the tip, and due to the increase in blade area toward the blade tip. The centrifugal air load also increases out toward the tip, and air is thrown out toward the tip. By extending the leading edge toward the blade tip, the increased pressure is contained so that laminar air flow over the blade surfaces will be maintained, and preventing air vortices from forming around the leading edge of the blade, thereby stalling the blade. Of course, a blade element similar to element 80, but including the curved trailing edge shown for the embodiment of FIGS. 7 and 8, could also be employed.

The propeller of FIGS. 2-4 and 7-8 also employ an extended leading edge having a dimension in the rotational direction which increases from the blade hub to the tip.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An aircraft propeller blade element that is characterized by:
   a straight sharp extended blade element leading edge with no helix;
   in that said leading edge rotates directly into the plane of rotation to provide unswirled laminar air flow to each side of said blade element without an interference of the air flow from one of the blade element to the other; and
   in that said extended leading edge has a dimension in the rotational direction which increases from the blade hub to the tip of the blade;
   whereby said leading edge virtually eliminates a vortex formation and prevents stagnated air from developing at said blade element leading edge.

2. A rotatably driven propeller blade element, including a leading edge element and a trailing edge element, the blade element being secured to a hub and rotatably driven in a plane of rotation, the blade element further having an outer blade tip opposite the hub, the blade element characterized in that:
   said leading edge is defined by an extended and substantially straight structure presenting a sharp edge, and wherein said leading edge does not define a helix from the hub to the blade outer tip;
   said leading edge rotates directly into the plane of rotation when the blade element is rotated; and
   said extended leading edge has a dimension in the rotational direction which increases from the hub to the outer tip of the blade.

3. The propeller blade element of claim 2 further characterized in that a cross-section of the blade element has a general "C" shape configuration.

4. The propeller blade element of claim 2 further characterized in that the blade element is secured to said hub without a variable pitch control.

5. The propeller blade element of claim 2 further characterized in that said trailing edge is curved away from the high aerodynamic load bearing face of said blade element.

6. A rotatably driven aircraft propeller blade element for an aircraft propulsion system in which a power driven rotating element situated within a frame generates a rearwardly moving air stream, the blade element including a leading edge element and a trailing edge element, and wherein the blade element is secured to a hub and rotatably driven in a plane of rotation to comprise said power driven rotating element, the blade element further having an outer blade tip opposite the hub, the blade element further characterized in that:
   said leading edge is defined by an extended and substantially straight structure presenting a sharp edge, and wherein said leading edge does not define a helix from the hub to the blade outer tip;
   said leading edge rotates directly into the plane of rotation when the blade element is rotated; and
   said extended leading edge has a dimension in the rotational direction which increases from the hub to the outer tip of the blade.

7. The propeller blade element of claim 6 further characterized in that a cross-section of the blade element has a general "C" shaped configuration.

8. A rotatably driven blade element, including leading edge element and a trailing edge element, the blade element being secured to a hub and rotatably driven in a plane of rotation, the blade element further having an outer blade tip opposite the hub, the blade element characterized in that:
   said leading edge defines a substantially straight line in a first region between the hub and the tip, and said leading edge is sharp and defined by an extended structure;
   said leading edge rotates directly into the plane of rotation when the blade element is rotated;
   said extended leading edge has a dimension in the rotational direction which increases from the hub to the outer tip of the blade; and
   said trailing edge is curved away from the aerodynamically loaded face of said blade element, and defines a helix in a second region between said hub and blade tip.

9. The blade element of claim 8, further characterized in that said leading edge defines a "C-shaped" cross-sectional configuration with a portion of said blade element forward of the trailing edge.

* * * * *